United States Patent [19]

Engdahl et al.

[11] Patent Number: 5,003,784

[45] Date of Patent: Apr. 2, 1991

[54] APPARATUS AND METHOD OF PRODUCING AN ICE SLURRY AT THE TRIPLE POINT OF A SOLUTION

[75] Inventors: Gerald E. Engdahl, Wheaton, Ill.; Tushar K. Shah, Houston, Tex.

[73] Assignee: Chicago Bridge & Iron Technical Services Company, Oak Brook, Ill.

[21] Appl. No.: 496,940

[22] Filed: Mar. 21, 1990

[51] Int. Cl.$^5$ .............................. B01D 9/04; C02F 1/22
[52] U.S. Cl. .......................................... 62/124; 62/59
[58] Field of Search ............... 62/124, 123, 434, 59

[56] References Cited

U.S. PATENT DOCUMENTS

| | | | |
|---|---|---|---|
| 3,098,733 | 7/1963 | Rosenstein et al. | 62/124 X |
| 3,443,393 | 5/1969 | Goldberg | 62/124 |
| 4,003,213 | 1/1977 | Cox | 62/124 |
| 4,581,052 | 4/1986 | Adler et al. | 62/124 X |
| 4,735,641 | 4/1988 | Engdahl | 62/532 |

Primary Examiner—Lloyd L. King
Attorney, Agent, or Firm—Marshall, O'Toole, Gerstein, Murray & Bicknell

[57] ABSTRACT

An ice slurry is produced at the triple point of water in a freezer vessel having vertical freezer tubes on which feed water falls as an outside film and coolant tubes on which cold coolant falls as an outside film, with the liquid coolant and liquid feed distributed to the tubes by a pan over the tubes. The resulting warmer coolant flows to a collecting pan at the vessel bottom and then through an outlet for withdrawing the coolant from the vessel, while the ice slurry is withdrawn through an outlet at the vessel bottom.

25 Claims, 2 Drawing Sheets

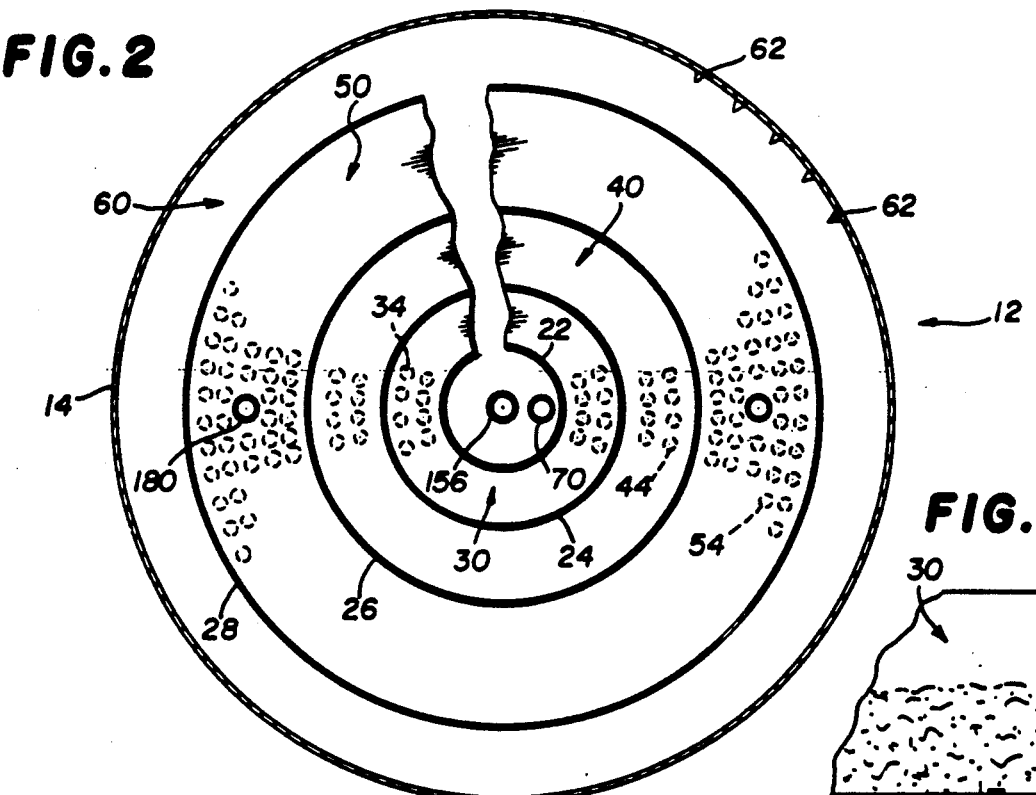
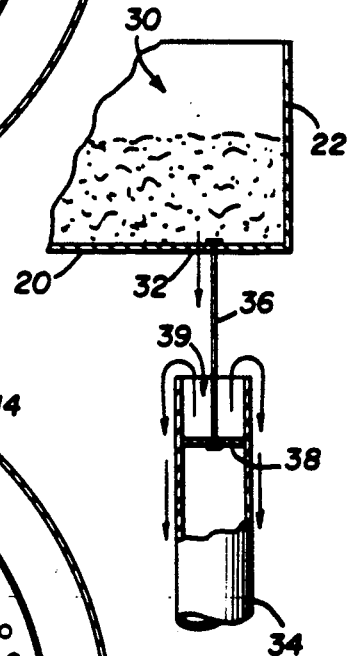
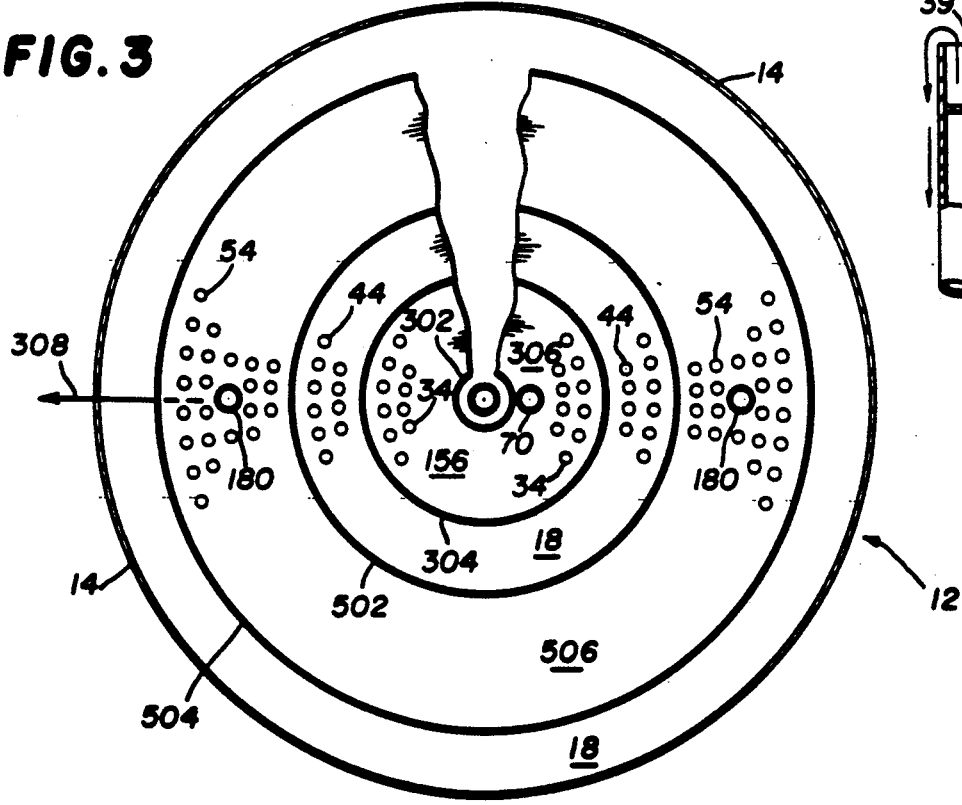

APPARATUS AND METHOD OF PRODUCING AN ICE SLURRY AT THE TRIPLE POINT OF A SOLUTION

This invention relates to apparatus and methods of producing refrigeration. More particularly, this invention is concerned with apparatus and methods of producing refrigeration in the form of ice, especially an aqueous slurry of ice crystals, at the triple point of the solution.

BACKGROUND OF THE INVENTION

Ice has been produced and used for many years for cooling and refrigeration purposes, such as air conditioning, food processing and preservation and in many industrial processes and operations. The ice produced for such purposes is often in block or similar large forms, or in the form of an aqueous slurry containing ice crystals.

Cox U.S. Pat. No. 4,003,213 discloses apparatus and methods for producing an aqueous ice slurry by utilization of the triple point of water. The triple point of water is the pressure at which ice, water and vapor are in equilibrium. This pressure has been determined to be about 4.6 millimeters of mercury absolute pressure.

According to the Cox U.S. Pat. No. 4,003,213, water is fed into a vessel having a pressure slightly below the water triple point pressure. Vapor formed in the vessel is continuously removed as it is formed. The continuous removal of water vapor from the interior of the vessel upsets the equilibrium which is restored by the vaporization of additional feed water. The heat required for vaporization is extracted from the water itself but as the water is already at its freezing point the removal of vapor also causes a remaining portion of the water to freeze. Thus, water is continuously and simultaneously boiling and freezing within the vessel. The heat removed to freeze 1 pound of ice is equal to 144 BTU, the heat of crystallization of water. The thermal energy required to vaporize 1 pound of water is about 1073 BTU. The ice crystals formed in the vessel are removed with water as a slurry mixture.

The vapor produced in the vessel is condensed, in one embodiment, in an antifreeze solution chilled by an evaporator coil external of the vessel. The antifreeze solution becomes diluted and is reconcentrated by passage over a hot condensing coil causing dissolved water to be evaporated. It is undesirable, however, to remove the vapor and condense it external of the vessel. The specific volume of the water vapor at the triple point is very large. The pressure drop in the large vapor ducts between vessels would reduce the coefficient of performance of the system. The evaporation process also requires the addition of considerable energy. This (Cox) process for producing ice has a low coefficient of performance.

Engdahl U.S. Pat. No. 4,735,641 also discloses a freezer vessel which is particularly useful for producing ice at the triple point of the solution.

Even though the prior art discloses freezer vessels there is still a need for an improved freezer vessel which provides a large surface area in the freezing section and which permits vapor to leave the liquid surface at a slow velocity so as to make it possible to reduce carry over of feed liquid droplets into the coolant solution. The carry over of liquid into the coolant substantially reduces the system coefficient of performance and contaminates the coolant.

SUMMARY OF THE INVENTION

The invention provides apparatus comprising an enclosed vessel in which an ice slurry can be produced at the triple point of an aqueous solution; a series of spaced apart aqueous liquid cooling surfaces in the vessel; a series of spaced apart aqueous feed liquid contact surfaces arranged in alternating arrangement between the cooling surfaces; inlet means to feed aqueous feed liquid into the vessel and to the feed liquid contact surfaces; inlet means to feed a cold liquid coolant into the vessel to cool the cooling surfaces; and outlet means to remove an ice slurry from the vessel.

In another embodiment, the invention includes a freezer vessel, especially suitable for producing an ice slurry at the triple point of an aqueous solution, having therein a vertical freezer surface on which an aqueous feed liquid falls as an outside film and a vertical coolant surface on which cold coolant falls as an outside film; means above the surfaces to distribute cold liquid coolant and liquid feed to the surfaces; a coolant collecting means at the vessel bottom; and an outlet at the vessel bottom to remove ice slurry.

In an additional embodiment of the invention there is provided a freezing apparatus comprising a space-enclosing vessel; a plurality of vertical coolant members suspended in the vessel; conduit means for feeding cold coolant liquid from outside the vessel to the vessel interior so that cold coolant liquid can flow downwardly on the coolant members with liquid feed vapor condensate; a plurality of vertical liquid feed freezer members suspended in the vessel; conduit means for feeding liquid feed from outside the vessel to the vessel interior so that liquid feed can flow downwardly on the liquid feed freezer members with at least partial conversion of the liquid feed thereon into solid particles; the vessel having collecting means in the bottom space of the vessel for collecting liquid feed and solid particles from the liquid feed freezer members; conduit means communicating with the liquid feed collecting space in the bottom of the vessel for withdrawing the mixture of liquid feed and solid particles from the vessel and delivering it outside the vessel; the vessel having a liquid coolant collecting means in the bottom space of the vessel positioned to receive liquid coolant from the coolant members; and conduit means communicating with the liquid coolant collecting means for withdrawing liquid coolant therefrom and delivering it outside the vessel.

More specifically, the invention includes a freezing apparatus comprising a space-enclosing vessel having a vertical cylindrical sidewall, a top joined to the sidewall and a bottom joined to the sidewall; a horizontal cold liquid coolant-receiving first pan, in an upper part of the vessel, in the form of a ring defining a circular channel having a bottom plate; conduit means communicating with the cold coolant-receiving first pan for delivering liquid coolant to the pan; a plurality of holes in the cold coolant-receiving first pan bottom plate through which cold liquid coolant can flow; a plurality of first coolant tubes suspended beneath the first pan bottom plate; each first coolant tube having a top end and a bottom end and with the top end located a short distance beneath one of the holes in the first pan bottom plate so that cold coolant liquid flowing through the hole can flow directly to the top end and then downwardly on the tube outer surface with liquid feed vapor condensate and flow of the liquid coolant past the bottom end; a liquid coolant-collecting first pan, located in a lower part of the vessel, in the form of a ring defining an upwardly facing circular channel; the coolant-collecting first pan being below the bottom ends of the cold first coolant tubes and positioned to receive liquid coolant flowing off the ends of the cold tubes; conduit means communicating with the coolant-collecting first pan to withdraw liquid coolant therefrom and deliver it outside of the vessel; a horizontal liquid feed-receiving first pan, in an upper part of the vessel, in the form of a ring defining a circular channel having a bottom plate; conduit means communicating with the liquid feed-receiving first pan for delivering liquid feed to the tray; a plurality of holes in the liquid feed-receiving first pan bottom plate through which liquid feed can flow; a plurality of first liquid feed tubes suspended beneath the liquid feed-receiving first pan bottom plate; each first liquid feed tube having a top end and a bottom end and with the top end located a short distance beneath one of the holes in the liquid feed first pan bottom plate so that liquid feed flowing through the hole can flow directly to the top end and then downwardly on the tube outer surface with at least partial conversion of the liquid feed flow thereon into solid particles and flow of the liquid feed and solid particles past the bottom end; the vessel having a bottom space for collecting the liquid feed and solid particles flowing off of the bottom ends of the first liquid feed tubes; and conduit means communicating with the liquid feed collecting space in the bottom of the vessel for removing the mixture of liquid feed and solid particles from the vessel.

The apparatus is particularly useful for producing an ice slurry, especially at the triple point of an aqueous solution.

The liquid coolant-receiving first pan and the cold liquid coolant-collecting first pan can have inner and outer diameters, with the inner diameters of both pans being substantially the same and with the outer diameters of both pans being substantially the same.

The liquid feed-receiving pan can have an outer diameter less than an inner diameter of the cold liquid coolant-receiving and collecting first pans. Also, the liquid feed-receiving pan can have an inner diameter greater than an outer diameter of the cold liquid coolant-receiving and collecting first pans.

The liquid feed-receiving ring can have an inner diameter and the liquid coolant-receiving ring can have an outer diameter less than the feed-receiving ring inner diameter. Also, the liquid feed-receiving ring can have an outer diameter and the liquid coolant-receiving ring can have an inner diameter greater than the feed-receiving ring outer diameter.

The liquid coolant-receiving first pan bottom plate and the liquid feed-receiving first pan bottom plate can be at substantially the same level in the vessel.

A non-condensible gas removal pipe can be vertically positioned adjacent the coolant tubes and have a plurality of spaced apart port holes, located along a substantial part of its height, through which non-condensible gases can be withdrawn from the vessel and disposed of. More specifically, a plurality of non-condensible gas removal vertical pipes can be spaced apart along a circular path between the coolant tubes.

The freezing apparatus can include mixing means in the lower part of the vessel to maintain the solid particles dispersed in the liquid feed. The mixing means can have a vertical shaft, centrally positioned in the vessel, extending through the vessel top; drive means can be located external of the vessel to rotate the shaft; the vertical shaft can have a lower end located in the bottom space of the vessel where the liquid feed and solid particles collect; and stirring vane means can be positioned on the shaft lower end.

The coolant tubes can be arranged in substantially radially concentric circles as can the feed tubes.

Each of the coolant tubes and the feed tubes can have an internal plug spaced downwardly from the top end thereby defining a pocket in the tube in which liquid accumulates and then overflows along the outer surface of the tube as a falling film.

The freezing apparatus may also include a liquid feed-receiving second pan in the upper portion of the vessel and adjoining the vessel side wall internal surface; means to supply liquid feed to the second pan; and means to distribute liquid feed from the second pan along the vessel side wall internal surface as a falling film.

The invention also provides a method for producing an ice slurry using a freezer vessel which does not require indirect heat transfer surfaces. As a result, heat transfer surface area fouling in the freezer is eliminated.

The invention furthermore provides a method for increasing the coefficient of performance of an ice producing system by preventing carryover of aqueous solution into the coolant. This is achieved by employing an apparatus as described above which has a physical arrangement which reduces the velocity of the water vapor leaving the surface of the aqueous solution feed liquid thereby minimizing or avoiding liquid droplet entrainment in the vapor which occurs at high vapor velocities.

The invention furthermore provides a method for reducing the water vapor flow pressure drop so as to increase the coefficient of performance in the production of an ice slurry in a freezer vessel which provides short and open water vapor flow paths to reduce pressure drop and thereby increase performance.

BRIEF DESCRIPTION OF THE DRAWINGS

FIG. 2 is a sectional view taken along the line 2—2 of FIG. 1;

FIG. 3 is a sectional view taken along the line 3—3 of FIG. 1; and

FIG. 4 is an enlarged view of the portion of FIG. 1 in an oval.

DETAILED DESCRIPTION OF THE DRAWINGS

Figure 1:
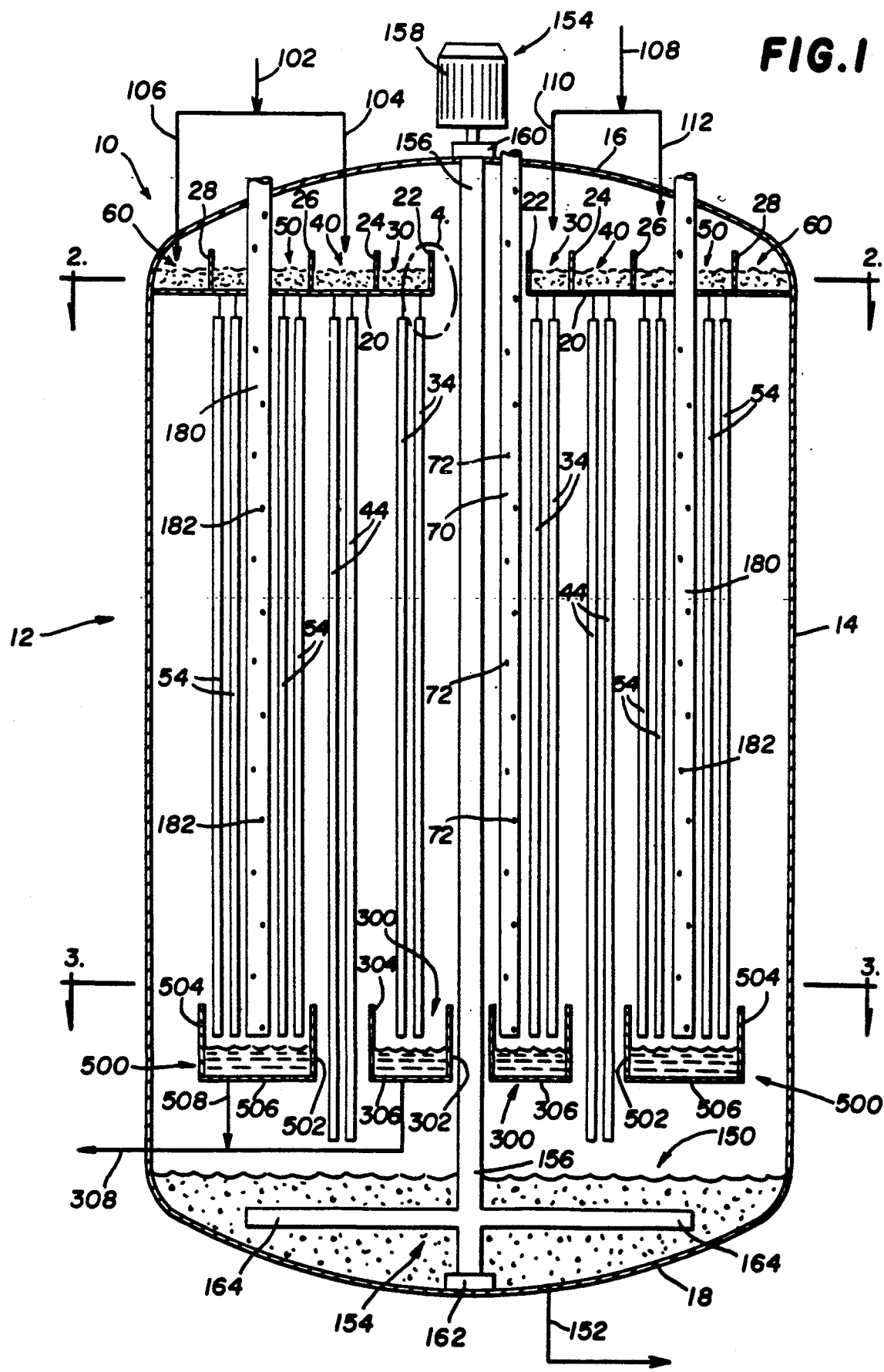
FIG. 1 is an elevational view, partially in section, of a freezing apparatus according to the invention.

To the extent it is reasonable and practical the same or similar elements which appear in the various views of the drawings will be identified by the same numbers.

With reference to the drawings the freezing apparatus 10 includes a vessel 12 having a circular cylindrical side wall 14 having an upper edge to which top 16 is joined. Bottom 18 is joined to the bottom edge of side wall 14. The vessel 12 is designed to operate at the triple point of an aqueous liquid or solution, which is the pressure at which ice, water and vapor are in equilibrium. With water, this pressure is about 4.6 millimeters of mercury absolute pressure.

A pan bottom plate 20 in the shape of a horizontal flat one piece circular disc is positioned in the upper part of vessel 12. Projecting upwardly from pan bottom plate 20 is a series of radial rings 22,24,26 and 28 positioned concentrically about the vertical axis of vessel 10.

The pair of vertical rings 22,24 and the disc bottom between them define a cold liquid coolant-receiving pan 30 having the shape of a circular channel and also having a plurality of holes or openings 32 in the disc portion constituting the channel bottom.

The pair of vertical rings 24,26 and the disc bottom between them define a cold liquid feed receiving pan 40 having the shape of a circular channel and also having a plurality of holes or openings 42 in the disc portion constituting the channel bottom.

The pair of vertical rings 26,28 and the disc bottom between them define a liquid coolant-receiving pan 50 having the shape of a circular channel and also having a plurality of holes or openings 52 in the disc portion constituting the channel bottom.

An additional liquid feed receiving pan 60 is defined by vertical ring 28, the adjacent vessel wall and the disc portion between them thereby defining a circular channel. The outer edge of the disc portion adjacent the vessel wall is provided with peripheral grooves or slots 62 which permit feed liquid to flow through and into contact with the vessel wall inner surface as a falling film which is cooled and part converted to solid particles. The feed liquid and solid particles collect as a slurry in the vessel bottom space.

The liquid feed is supplied to liquid feed receiving pans 40 and 60 by feed pipe 102 and branch pipes 104,106. The cold liquid coolant is supplied to liquid coolant-receiving pans 30,50 by coolant pipe 108 and branch pipes 110,112.

The liquid feed can be new or fresh liquid not previously fed through the apparatus. However, the liquid feed can also constitute a mixture of fresh liquid and recirculated concentrate produced when water is removed, as in the form of ice or water vapor, from fresh liquid feed, or recirculated ice slurry.

A plurality of coolant tubes 34 are suspended beneath the liquid coolant-receiving pan 30. The tubes can be arranged in radially concentric circles. Each tube 34 is suspended by a wire 36 connected at the top to the pan bottom plate 20 adjacent a hole 32 therein. Instead of a wire 36 a clip or other type of tube support made of metal, plastic, carbon fiber or ceramic material which functions in the same way may be used. The lower end of wire 36 is connected to a plug 38 located inside each tube 34 a short distance below the upper end of the tube thereby forming a pocket 39. Liquid coolant in pan 30 flows through hole 32 into pocket 38 and when the pocket is full the liquid coolant overflows and forms a falling film on the outer surface of the tube.

Liquid coolant flows off the ends of coolant liquid tubes 34 into liquid coolant-collecting pan 300 in the form of a circular ring having vertical sides 302,304 and a horizontal bottom 306 thereby defining a channel shaped pan. The liquid coolant is withdrawn from pan 300 by means of pipe 308 and reprocessed so that it can be recirculated into the vessel for repetitive use.

A plurality of feed tubes 44 are positioned in radially concentric circles and are also suspended beneath the holes 42 in the liquid feed receiving pan 40. The feed tubes are suspended in the same manner that the coolant-receiving tubes are suspended and as illustrated in FIG. 4. The feed tubes also have a plug 38, like that shown in FIG. 4, and a pocket like pocket 39 so that a falling film is created on the outside surface of feed tubes 44 by liquid feed overflowing from the pocket.

The liquid feed falling film is cooled, by direct, as distinguished from indirect, heat exchange as it flows down the outer surface of tubes 44 and part of the liquid is converted to solid particles or crystals. The mixture of liquid feed and solid particles flows off the lower end of tubes 44 and collects in the bottom space 150 as a slurry. The slurry can be withdrawn therefrom by outlet pipe 152.

The vessel 12 is provided with a mixing device 154 which includes a vertical rotary shaft 156 axially mounted in the vessel and driven by an electric motor 158 mounted outside of the vessel. The upper end of the shaft 156 is secured against lateral and vertical movement and sealed by bearing and seal 160 mounted on the vessel top 16. The lower end of the shaft 156 is secured against lateral movement by bearing 162 mounted to the vessel bottom 18. Stirring vanes 164 project radially outwardly from the lower end of the shaft 156 so that when the shaft rotates the slurry in the vessel bottom is stirred.

Suspended beneath the bottom of liquid coolant-receiving pan 50 is a plurality of vertical coolant tubes 54 which are suspended beneath the holes 52 in the same way as that illustrated in FIG. 4. The upper ends of the tubes 54 also have a pocket like pocket 39. The tubes 54 are arranged in radially concentric circles or rows.

The cold liquid coolant fed to pan 50 flows downwardly through holes 52 into the pockets 39 in the upper ends of tubes 54. The cold liquid coolant overflows the pockets 39 and forms a falling film on the outer surface of each coolant tube 54.

Liquid coolant flows off the lower ends of tubes 54 and into liquid coolant-collecting pan 500. Coolant-collecting pan 500 constitutes an open top channel-shaped member having a pair of spaced apart vertical rings 502,504 joined at their lower edges to a bottom plate 506. The liquid coolant can be withdrawn from coolant-collecting pan 500 by means of withdrawal pipes 508 and 308.

Because the liquid feed and the liquid coolant will generally contain small amounts of non-condensible vapor, the vessel is provided with means to remove those vapors. Thus, a non-condensible gas removable vertical pipe 70 is positioned adjacent tubes 34. Pipe 70 has a plurality of spaced apart holes 72 located along a substantial part of its height in the vessel 12. The non-condensible gases flow through the holes with some water vapor into the pipe interior space. The mixture then flows upwards in the pipe and out of the vessel to a treatment system.

Additional vertical pipes 180 having holes 182 therein are located spaced apart in a circular path in between the coolant tubes 54. The pipes 180 function in the same way as pipe 70.

The described apparatus can be used with a wide variety of liquid feed compositions. However, it is particularly useful with aqueous liquid feeds which are to be concentrated such as an aqueous waste stream, fruit and vegetable juices and/or where an ice slurry is required.

An ice slurry is often needed for refrigeration purposes as, for example, in processing foods or in cooling deep mines. The apparatus is especially useful for mine cooling because the apparatus is capable of producing an ice slurry from mine water while simultaneously concentrating high amounts of dissolved solids or impurities. The liquid feed and liquid coolant distribution structure of the apparatus is characterized by simplicity and it avoids elements which can become easily plugged or greatly hinder operation if somewhat fouled by surface deposits.

A further advantage of the apparatus is that the tubes provide a large heat and mass transfer surface area in a small amount of vessel volume. Because of the large tube surface area of the freezer, water vapor leaving the feed tubes leaves at a slow velocity making it possible to prevent carry over of feed liquid droplets into the coolant solution.

While the apparatus can be made of a metal such as steel or aluminum, it can also be made of an epoxy-fiber glass material or other plastic material.

Many different liquid coolants can be used in the apparatus. Suitable liquid coolants are an aqueous solution of ethylene glycol, methanol or ethanol and an aqueous solution of an inorganic salt such as sodium chloride or calcium chloride.

As aqueous liquid feed flows down the feed tubes as a falling film part of the water is converted to vapor which causes a portion of the remaining water to freeze, forming ice crystals or particles. The resulting slurry flows to the bottom of the vessel where it collects and can be removed for refrigeration purposes if the liquid feed is essentially water. If the liquid feed is a fruit or vegetable juice the resulting slurry can be removed from the vessel, the ice separated and the concentrated juice packaged for subsequent use.

The aqueous liquid feed could contain one or more inorganic salts or one or more organic liquids or a mixture of the two. The apparatus can be used to concentrate the feed solution by the removal of water in the form of ice. The concentrated ice slurry can be removed from the vessel and be sent to a wash column where the concentrate can be separated from the ice. The concentrate can be a food product such as coffee or a concentrated waste stream. The apparatus could be used to produce fresh water from sea water or other saline waters.

The vapor from the feed liquid is condensed by the cold liquid coolant which thereby becomes diluted but which after removal from the vessel can be reconcentrated and cooled to be recycled to the vessel.

The foregoing detailed description has been given for clearness of understanding only, and no unnecessary limitations should be understood therefrom, as modifications will be obvious to those skilled in the art.

What is claimed is:

1. Apparatus comprising:
   an enclosed vessel in which an ice slurry can be produced at the triple point of an aqueous solution;
   a series of spaced apart aqueous liquid cooling surfaces in the vessel;
   a series of spaced apart aqueous liquid contact surfaces arranged in substantially alternating arrangement between the cooling surfaces;
   inlet means to feed an aqueous feed liquid into the vessel and to the feed liquid contact surfaces;
   inlet means to feed a cold liquid coolant into the vessel to cool the cooling surfaces; and
   outlet means to remove an ice slurry from the vessel.

2. A freezer vessel having a bottom, especially suitable for producing an ice slurry at the triple point of an aqueous solution, having therein a vertical freezer surface on which an aqueous feed liquid can fall as an outside film and a vertical coolant surface on which liquid coolant can fall as an outside film;
   means above the surfaces to distribute cold liquid coolant and liquid feed to the respective surfaces;
   a coolant collecting means at the vessel bottom; and
   an outlet at the vessel bottom to remove ice slurry.

3. A freezing apparatus comprising:
   a space-enclosing vessel;
   a plurality of vertical coolant members suspended in the vessel;
   conduit means for feeding cold coolant liquid from outside the vessel to the vessel interior so that cold coolant liquid can flow downwardly on the coolant members with liquid feed vapor condensate;
   a plurality of vertical liquid feed freezer members suspended in the vessel;
   conduit means for feeding liquid feed from outside the vessel to the vessel interior so that liquid feed can flow downwardly on the liquid feed freezer members with at least partial conversion of the liquid feed thereon into solid particles;
   the vessel having collecting means in the bottom space of the vessel for collecting liquid feed and solid particles from the liquid feed freezer members;
   conduit means communicating with the liquid feed collecting space in the bottom of the vessel for withdrawing the mixture of liquid feed and solid particles from the vessel and delivering it outside the vessel;
   the vessel having a liquid coolant collecting means in the bottom space of the vessel positioned to receive liquid coolant from the coolant members; and
   conduit means communicating with the liquid coolant collecting means for withdrawing liquid coolant therefrom and delivering it outside the vessel.

4. A freezing apparatus comprising:
   a space-enclosing vessel having a vertical cylindrical sidewall, a top joined to the sidewall and a bottom joined to the sidewall;
   a horizontal liquid coolant-receiving first pan, in an upper part of the vessel, in the form of a ring defining a circular channel having a bottom plate;
   conduit means communicating with the coolant-receiving first pan for delivering cold liquid coolant to the pan;
   a plurality of holes in the coolant-receiving first pan bottom plate through which cold liquid coolant can flow;
   a plurality of first coolant tubes suspended beneath the first pan bottom plate;
   each first coolant tube having a top end and a bottom end and with the top end located a short distance beneath one of the holes in the first pan bottom plate so that coolant liquid flowing through the hole can flow directly to the top end and then downwardly on the tube outer surface with liquid feed vapor condensate and flow of the liquid coolant past the bottom end;
   A liquid coolat-collecting first pan, located in a lower part of the vessel, in the form of a ring defining an upwardly facing circular channel;
   the coolant-collecting first pan being below the bottom ends of the first coolant tubes and positioned to receive liquid coolant flowing off the ends of the tubes;
   conduit means communicating with the coolant-collecting first pan to withdraw liquid coolant therefrom and deliver it outside of the vessel;

a horizontal liquid feed-receiving first pan, in an upper part of the vessel, in the form of a ring defining a circular channel having a bottom plate;

conduit means communicating with the liquid feed-receiving first pan for delivering liquid feed to the tray;

a plurality of holes in the liquid feed-receiving first pan bottom plate through which liquid feed can flow;

a plurality of first liquid feed tubes suspended beneath the liquid feed-receiving first pan bottom plate;

each first liquid feed tube having a top end and a bottom end and with the top end located a short distance beneath one of the holes in the liquid feed first pan bottom plate so that liquid feed flowing through the hole can flow directly to the top end and then downwardly on the tube outer surface with at least partial conversion of the liquid feed flow thereon into solid particles and flow of the liquid feed and solid particles past the bottom end;

the vessel having a bottom space for collecting the liquid feed and solid particles flowing off of the bottom ends of the first liquid feed tubes; and conduit means communicating with the liquid feed collecting space in the bottom of the vessel for removing the mixture of liquid feed and solid particles from the vessel.

5. A freezing apparatus according to claim 4 in which the cold liquid coolant-receiving first pan and the liquid coolant-collecting first pan have inner and outer diameters, the inner diameters of both pans are substantially the same and the outer diameters of both pans are substantially the same.

6. A freezing apparatus according to claim 5 in which the liquid feed-receiving pan has an outer diameter less than an inner diameter of the liquid coolant-receiving and collecting first pans.

7. A freezing apparatus according to claim 5 in which the liquid feed-receiving pan has an inner diameter greater than an outer diameter of the liquid coolant-receiving and collecting first pans.

8. A freezing apparatus according to claim 4 in which the liquid feed-receiving ring has an inner diameter and the liquid coolant-receiving ring has an outer diameter less than the feed-receiving ring inner diameter.

9. A freezing apparatus according to claim 4 in which the liquid feed-receiving ring has an outer diameter and the liquid coolant-receiving ring has an inner diameter greater than the feed-receiving ring outer diameter.

10. A freezing apparatus according to claim 4 in which the liquid coolant-receiving first pan bottom plate and the liquid feed-receiving first pan bottom plate are at substantially the same level in the vessel.

11. A freezing apparatus according to claim 4 comprising:

a non-condensible gas removal pipe, vertically positioned adjacent the coolant tubes, having a plurality of spaced apart port holes located along a substantial part of its height through which non-condensible gases can be withdrawn from the vessel and disposed of.

12. A freezing apparatus according to claim 4 comprising:

mixing means in the lower part of the vessel to maintain the solid particles dispersed in the liquid feed.

13. A freezing apparatus according to claim 12 in which:

the mixing means includes a vertical shaft centrally positioned in the vessel and extending through the vessel top;

drive means external of the vessel to rotate the shaft; and the vertical shaft having a lower end located in the bottom space of the vessel where the liquid feed and solid particles collect; and stirring vane means on the shaft lower end.

14. A freezing apparatus according to claim 4 in which:

the coolant tubes are arranged in substantially radially concentric circles.

15. A freezing apparatus according to claim 4 in which the feed tubes are arranged in substantially radially concentric circles.

16. A freezing apparatus according to claim 14 comprising:

a plurality of non-condensible gas removal vertical pipes spaced apart along a circular path between the coolant tubes;

each pipe having a plurality of spaced apart port holes located along a substantial part of its height through which non-condensible gases can be withdrawn from the vessel and disposed of.

17. A freezing apparatus according to claim 4 in which each of the coolant tubes and the feed tubes have an internal plug spaced downwardly from the top end thereby defining a pocket in the tube in which liquid accumulates and then overflows along the outer surface of the tube as a falling film.

18. A freezing apparatus according to claim 4 comprising:

a liquid feed-receiving second pan in the upper portion of the vessel and adjoining the vessel side wall internal surface;

means to supply liquid feed to the second pan; and means to distribute liquid feed from the second pan along the vessel side wall internal surface as a falling film.

19. A method comprising:

feeding an aqueous solution into an enclosed vessel, in which an ice slurry can be produced at the triple point of the aqueous solution, and onto a series of spaced apart aqueous solution contact surfaces in the vessel;

feeding a cold liquid coolant into the enclosed vessel onto a series of spaced apart aqueous solution cooling surfaces in the vessel;

collecting and removing the resulting ice slurry from the vessel; and collecting and removing the liquid coolant from the vessel.

20. A method according to claim 19 in which the aqueous solution contact surfaces and the liquid coolant contact surfaces are direct, as distinguished from indirect, heat transfer surfaces.

21. A method according to claim 19 or 20 in which the coefficient of performance of the method is increased by reducing the velocity of the water vapor leaving the surface of the aqueous solution thereby minimizing liquid droplet entrainment in the vapor.

22. A method according to claim 19 or 20 in which the water vapor flow pressure drop is reduced by short and open water flow paths in the vessel thereby increasing the coefficient of performance.

23. A method according to claim 19 in which the aqueous solution contains an inorganic salt.

24. A method according to claim 19 in which the aqueous solution contains an organic liquid.

25. A method according to claim 19 in which the aqueous solution is selected from a member of the group consisting of a concentrated waste stream, a coffee solution, a fruit juice, a vegetable juice and saline water.

* * * * *

UNITED STATES PATENT AND TRADEMARK OFFICE
CERTIFICATE OF CORRECTION

PATENT NO. : 5,003,784

DATED : April 2, 1991

INVENTOR(S) : G.E. Engdahl et al

It is certified that error appears in the above-identified patent and that said Letters Patent is hereby corrected as shown below:

Column 5, line 14, before "liquid" insert -- cold --;

column 8, line 54, before "coolant" insert -- cold --, line 59, change "A" to -- a -- and "coolat" to -- coolant --.

Signed and Sealed this

Eleventh Day of August, 1992

Attest:

DOUGLAS B. COMER

*Attesting Officer*   Acting Commissioner of Patents and Trademarks